US009753356B2

(12) United States Patent
Liang et al.

(10) Patent No.: US 9,753,356 B2
(45) Date of Patent: Sep. 5, 2017

(54) CRADLE HEAD, CRADLE HEAD CAMERA DEVICE AND UNMANNED AERIAL VEHICLE

(71) Applicant: Zerotech (Shenzhen) Intelligence Robot Co., Ltd, Shenzhen, Guangdong (CN)

(72) Inventors: Yucheng Liang, Beijing (CN); Fuhua Ai, Beijing (CN)

(73) Assignee: Zerotech (Shenzhen) Intelligence Robot Co., Ltd, Shenzhen (CN)

( * ) Notice: Subject to any disclaimer, the term of this patent is extended or adjusted under 35 U.S.C. 154(b) by 0 days.

(21) Appl. No.: 15/210,582

(22) Filed: Jul. 14, 2016

(65) Prior Publication Data
US 2017/0017138 A1   Jan. 19, 2017

(30) Foreign Application Priority Data
Jul. 16, 2015   (CN) .................... 2015 2 0518323 U

(51) Int. Cl.
  *G03B 15/00*   (2006.01)
  *B64C 39/02*   (2006.01)
  *B64D 47/08*   (2006.01)
  *G03B 17/56*   (2006.01)

(52) U.S. Cl.
  CPC .......... *G03B 15/006* (2013.01); *B64C 39/024* (2013.01); *B64D 47/08* (2013.01); *G03B 17/561* (2013.01)

(58) Field of Classification Search
None
See application file for complete search history.

(56) References Cited

U.S. PATENT DOCUMENTS

2015/0053833 A1*  2/2015  St. Louis ............. G03B 15/006
                                                           248/278.1

* cited by examiner

Primary Examiner — Rochelle-Ann J Blackman
(74) Attorney, Agent, or Firm — Leydig, Voit & Mayer, Ltd.

(57) ABSTRACT

A cradle head includes: a yaw support, wherein one end of the yaw support is rotatable around a yaw axis; a pitching support, which is rotatably connected to the yaw support via a pitching axis, wherein a camera device mounting seat is provided on the pitching support; a first casing attached on the pitching support, wherein a first accommodating space is provided within the first casing, wherein the camera device mounting seat is disposed within the first accommodating space, and wherein a camera hole is provided in the first casing; and a third casing, provided on the yaw support, wherein a third accommodating space is provided within the third casing, the yaw support being disposed within the third accommodating space; wherein the third casing and the first casing form a part of a curved outer surface of the cradle head.

19 Claims, 5 Drawing Sheets

CRADLE HEAD, CRADLE HEAD CAMERA DEVICE AND UNMANNED AERIAL VEHICLE

CROSS-REFERENCE TO RELATED APPLICATIONS

Priority is claimed to Chinese Patent Application No. 201520518323.X, filed on Jul. 16, 2015, the entire disclosure of which is hereby incorporated by reference herein.

FIELD

The present application relates to a cradle head, and more specifically to a cradle head having a protective housing and a cradle head camera device and an unmanned aerial vehicle.

BACKGROUND

A cradle head is an important component for aerial photography of an unmanned aerial vehicle. The cradle head is for carrying an imaging device such as a camera, and controlling swiveling, as well as shooting angle, of the camera.

Currently, cameras are directly fixed on a cradle head support in most cases. The cradle head support and the camera are both exposed to an external environment and susceptible to erosion from rain, sand and dust, such that the camera and the cradle head, which are precise and delicate instruments, are very easily damaged or worn.

SUMMARY

Exemplary embodiments of the invention provide a cradle head having a protective housing, which can protect a camera device disposed on the cradle head.

In an exemplary embodiment, a cradle head comprises: a yaw support one end of which is rotatable around a yaw axis; a pitching support which is rotatably connected to the yaw support via a pitching axis, on the pitching support being provided a camera device mounting seat; a first casing attached on the pitching support, within the first casing being provided an accommodating space, within the accommodating space being disposed the camera device mounting seat, the first casing including a camera hole; a third casing provided on the yaw support, within the third casing being provided an accommodation space, the yaw support being disposed within the accommodation space of the third casing; and the third casing and the first casing form a curved outer surface.

In an exemplary embodiment, the cradle head further comprises: a roll support one end of which is rotatably connected to the other end of the yaw support via a rolling axis; a second casing provided on the roll support, within the second casing being provided an accommodation space, the roll support being disposed within the accommodation space of the second casing; and the first casing, the second casing and the third casing form a curved outer surface.

In an exemplary embodiment, the second casing comprises first and second semi-casings which are attached to the two sides of the roll support, the two semi-casings being of an outward concave curved shape, a surface of the first casing is of a curved shape, the two sides of the first casing are planar, the camera hole is provided on the curved surface of the first casing, and the second casing and the first casing form a spherical outer surface.

In an exemplary embodiment, a waterproof flange is provided on each of the two sides of the first casing along the circumferential direction of the pitching axis.

In an exemplary embodiment, an annular V groove is defined between the waterproof flange and the side of the first casing.

In an exemplary embodiment, the pitching support is disposed within the first casing, the roll support and the pitching axis are disposed within the second casing, and the yaw axis, the yaw support, and the rolling axis are disposed within the third casing.

In an exemplary embodiment, a surface of the third casing is curved.

In an exemplary embodiment, the first casing, the second casing and the third casing form a waterdrop-shaped outer surface in whole.

In another exemplary embodiment, the invention further provides a cradle head camera device comprising the cradle head and a camera device, the camera device being provided on a camera device mounting seat.

In an exemplary embodiment, the camera device is an imaging core or a camera having 30× or 36× optical zoom.

In yet another exemplary embodiment, the invention further provides an unmanned aerial vehicle comprising a cradle head camera device.

The cradle head having a protective housing and a cradle head camera device and an unmanned aerial vehicle according to exemplary embodiments of the invention have at least one of the following advantages:

1. By providing a protective housing, the camera device, when being mounted on the cradle head, is disposed within the protective housing, the outer surface of the protective housing is curved, and the gap between the parts of the protective housing keeps constant when the cradle head is in multiple angles and multiple orientations, under the protection of the protective housing, the camera device may withstand erosion from outer wind, sands, and rains, thereby preventing fault due to damage from erosion; meanwhile, respective connecting shaft structures of the cradle head can also be protected; on the other hand, because the camera device and the cradle head support structure are protected by the protective housing in a long term, the aging speed can be reduced, thereby prolonging the service life of the device.

2. The cradle head support and the camera device are enclosed within the protective housing; the outer surface of the protective housing is curved, while the streamlined structural design can reduce air resistance during flight and alleviate the burden levied on the flying unmanned aerial vehicle; meanwhile, due to the relatively small air resistance, the stability of the unmanned aerial vehicle and the cradle head can be enhanced, thereby guaranteeing the quality of aerial photos.

3. A simple and compact structure, a high spatial utilization, and a low cost.

BRIEF DESCRIPTION OF THE ACCOMPANYING DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

Figure 1:
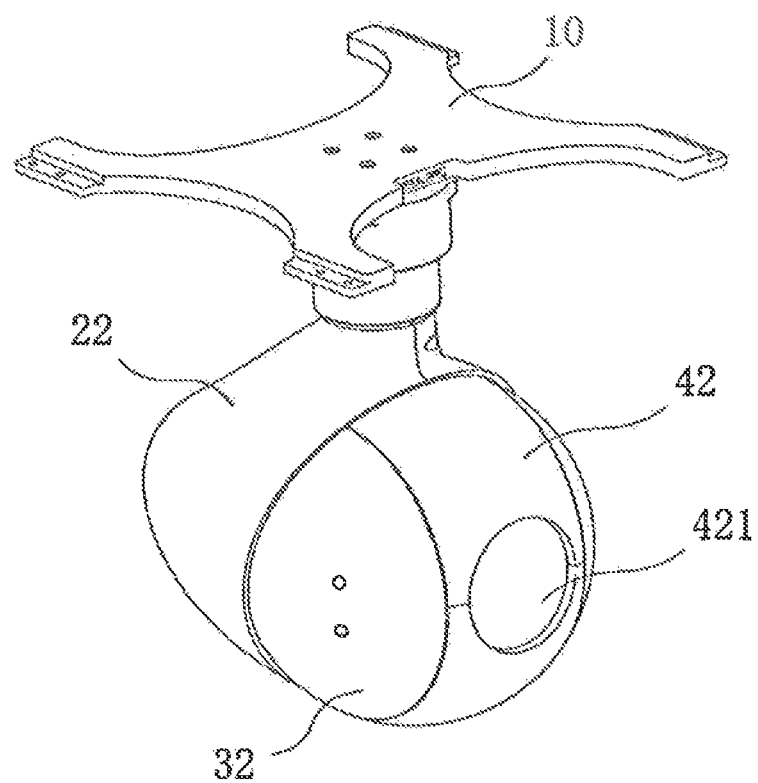
FIG. 1 illustrates a schematic structural diagram of a cradle head having a protective housing according to an exemplary embodiment.
Figure 2:
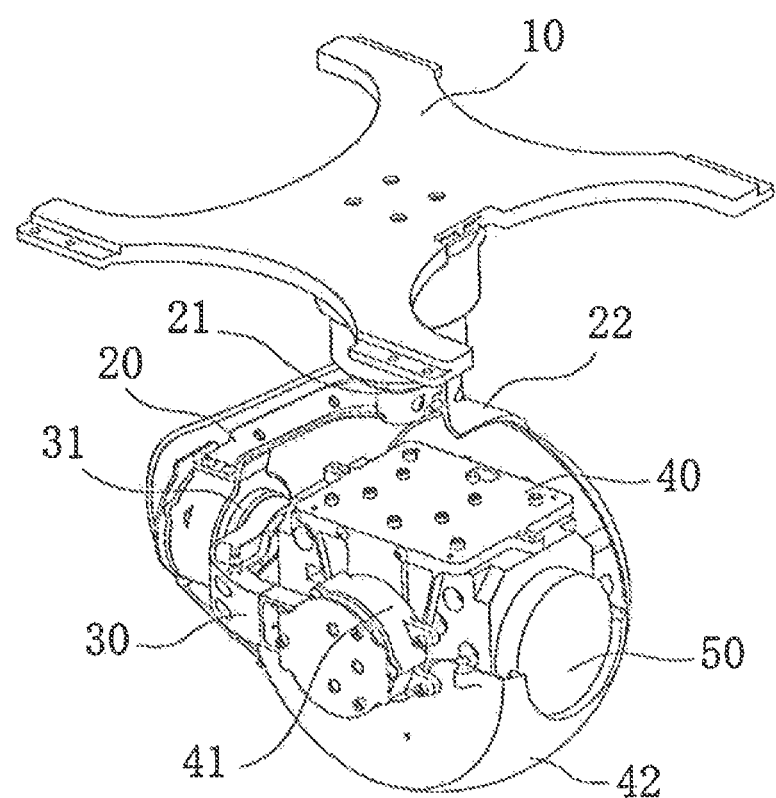
FIG. 2 illustrates a schematic diagram of an internal structure of a cradle head having a protective housing according to an exemplary embodiment after being mounted with a camera device.

REFERENCE NUMERALS 10 cradle head pedestal
20 yaw support
21 yaw axis
22 third casing
30 roll support
31 rolling axis
32 second casing
40 pitching support
41 pitching axis
42 first casing
421 camera hole
422 waterproof flange
50 camera device

DETAILED DESCRIPTION

Exemplary embodiments of the invention are described below in detail with reference to the accompanying drawings.

As illustrated in FIGS. 1-4, the cradle head comprises a cradle head pedestal 10; a yaw support 20 one end of which is rotatable around a yaw axis 21; a roll support 30 one end of which is rotatably connected to the other end of the yaw support 20 via a rolling axis 31; a pitching support 40 which is rotatably connected to the yaw support 20 via a pitching axis 41, on the pitching support being provided a camera device mounting seat.

In an exemplary embodiment, the yaw axis 21 is vertically disposed, the rolling axis 31 and the pitching axis 41 are horizontally disposed, and the yaw axis 21, rolling axis 31, and the pitching axis 41 are perpendicular to each other. A first casing 42 is provided on the pitching support 40, an accommodating space is provided within the first casing 42, the camera device mounting seat is disposed within the accommodating space, and a camera hole is provided on the first casing 42.

The cradle head pedestal 10 is for connecting the cradle head to an unmanned aerial vehicle body. The yaw support 20 of the cradle head may rotate about the yaw axis 21. The roll support 30 may rotate about the rolling axis 31. The pitching support 40 may rotate about the pitching axis 41. Besides, rotation of the three supports may be combined with one another, thereby effecting rotation of the cradle head in multiple angles and multiple orientations, wherein a camera device mounting seat is provided on the pitching support 40 for mounting the camera device, such that the camera device can follow the pitching support 40 to rotate in multiple angles and orientations, thereby effecting image shooting in multiple angles and all directions. The camera device in an exemplary embodiment is a 30× or 36× optical zoom imaging core, but is not limited thereto. Other models of cameras or imaging cores may be selected as appropriate. The structures of the three supports and three rotational axes mentioned above, as well as their connection relationships, their mounting relationships with the camera device, and their working principles, are all conventional technologies, which will not be described in detailed here.

The first casing 42 is attached to the pitching support 40 and can make a pitching rotation following the pitching support 40. Within the first casing 42 is provided an accommodation space, the pitching support, camera device mount seat and the camera mounted thereon being all disposed within the accommodation space and surrounded and protected by the first casing 42. A camera hole 421 is disposed on the first casing 42. When mounting the camera device, the lens is aligned with the camera hole 421. During the rotation process, the lens can always maintain a position facing the camera hole 421, thereby implementing shooting.

Figure 3:
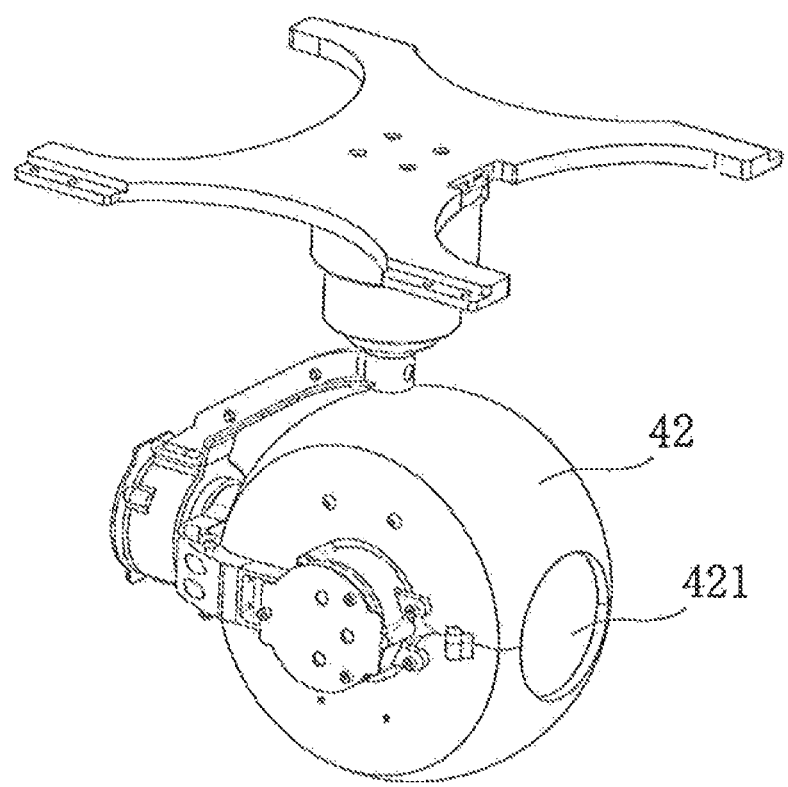
FIG. 3 illustrates a schematic structural diagram of a cradle head having a protective housing according to an exemplary embodiment with a first casing being mounted.

As illustrated in FIG. 3, a face of the first casing 42 is of a curved shape; the two sides of the first casing are planar, and the camera hole is provided on the curved surface of the first casing. The first casing 42 surrounds an exterior side of the pitching support 40, but does not wrap around the roll support 30; the roll support 30 is disposed exterior to the first casing 42 and connected to the pitching support 40 through the pitching axis 41. Consequently, during the process of rotating with the pitching support 40, the first casing 42 will not have an issue of blocking and stopping the roll support 30, thereby effecting smooth cooperation. For the convenience of manufacturing and mounting, the first casing in an exemplary embodiment comprises first and second semi-casings. Of course, the present application is not limited thereto. Those skilled in the art may flexibly design compositions of the casing according to actual needs, but such compositions should fall within the protection scope of the present application. Likewise, the principle also applies to the second casing and third casing discussed below.

Further, in order to protect other components of the cradle head, a second casing and a third casing may be provided to protect the roll support and the yaw support, respectively. Similar to the first casing, the second casing and the third casing both have an internal accommodation space, and the roll support and yaw support are located in corresponding accommodation space, respectively, thereby achieving protection.

Figure 4:
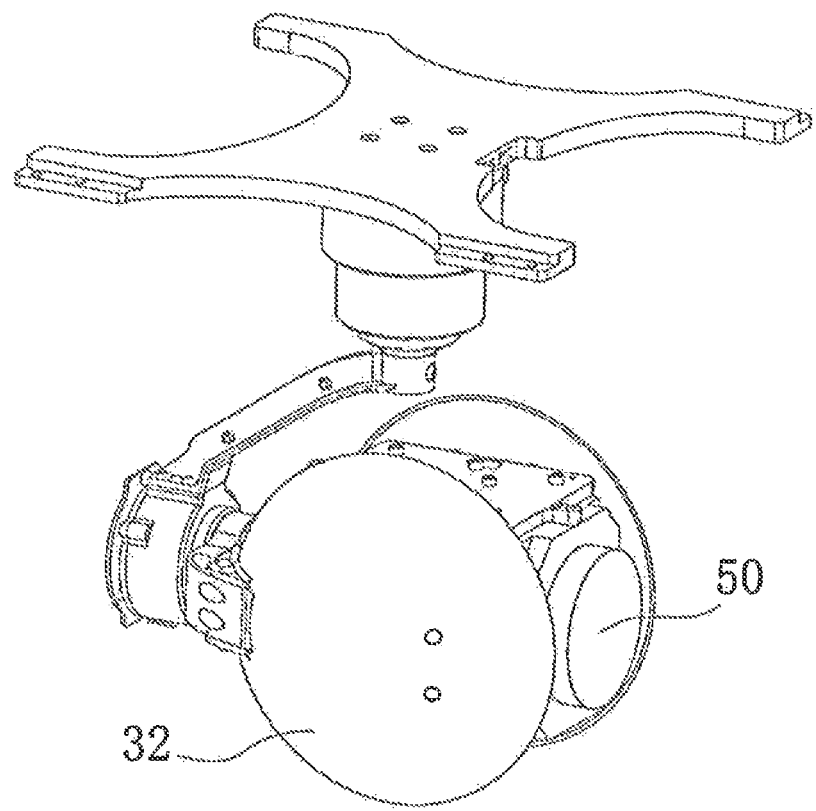
FIG. 4 illustrates a schematic structural diagram of a cradle head having a protective housing according to an exemplary embodiment with a second casing being mounted.

FIG. 4 illustrates a structural schematic diagram of the second casing 32. The second casing 32 is secured to the roll support 30 and can make a roll rotation following the roll support 30, that is to say, the second casing 32 rotates around the rolling axis 31. The second casing 32 has an accommodation space therein. The roll support 30 is disposed within the accommodation space of the second casing 30 and protected thereby. In an exemplary embodiment, as illustrated in FIG. 4, the second casing comprises first and second semi-casings that are attached to both sides of the roll support 30, respectively; after the two semi-casings are mounted, they are combined with the first casing to surround the roll support 30 and its connection portion with the pitching support 40, as well as structures like the pitching axis 41, thereby achieving protection.

A cradle head and camera component may suffer from strong air resistance during an aerial shooting process of the unmanned aerial vehicle. Larger air resistance will increase the flight burden of the unmanned aerial vehicle and corresponding energy consumption; additionally, due to the impact of air resistance, the cradle head, and/or even the entire unmanned aerial vehicle, may become unsteady, while an aerial picture shot by the camera needs a higher stability for quality assurance. Therefore, larger air resistance may generate a serious impact on aerial photography quality.

To solve the above problem, the two semi-casings of the second casing 32 according to exemplary embodiments of the invention may be designed as an outward concave curved shape, such that when they are mounted on the roll support 30, they may form a curved outer surface with the first casing 42, such as the curved surface being spherical, thereby reducing the air resistance during aerial photography and achieving a higher aerial photography image quality.

The third casing 22 is attached onto the yaw support 20 and can rotate with the yaw support 20, i.e., rotating about the yaw axis 21. The third casing 22 is provided therein with an accommodation space; the yaw support is disposed within the accommodation space of the third casing 22 and protected thereby. In an exemplary embodiment, the third casing 22 surrounds the yaw axis 21, yaw support 20, and rolling axis 31 to effect protection. Further, the third casing 22 is also of a curved shape with a smooth surface; after it is mounted on the yaw support 20, it may form a curved outer surface with the second casing 32 and the first casing 42, thereby realizing the whole protective housing as a streamlined outer surface, which reduces the air resistance upon aerial photography and achieves a higher aerial photograph image quality, as illustrated in FIG. 1.

In an exemplary embodiment, the first casing 42, second casing 32 and third casing 22 preferably form a waterdrop-shaped outer surface.

Figure 5:
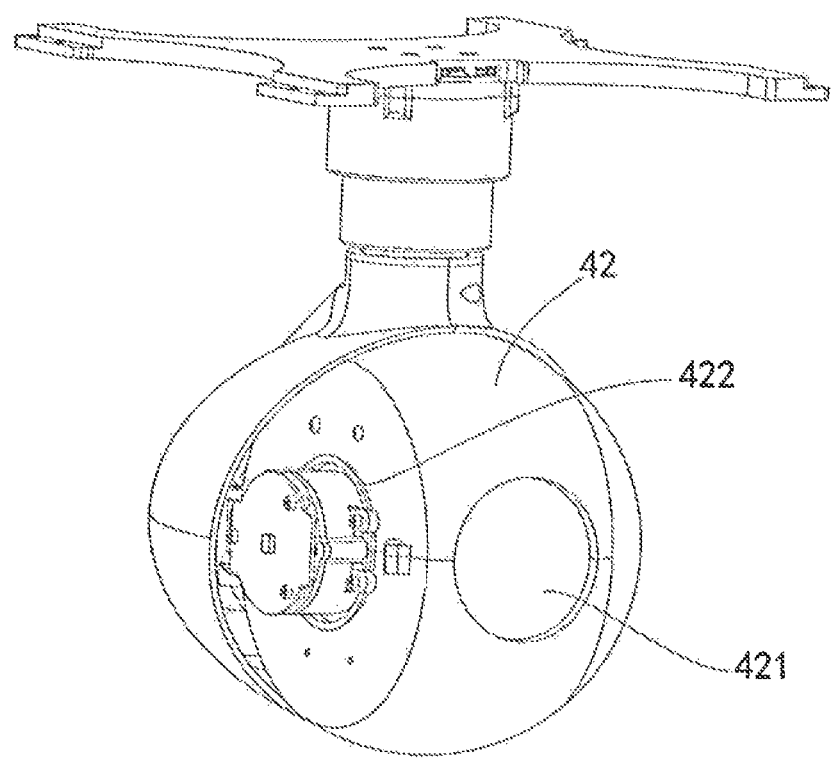
FIG. 5 illustrates a schematic structural diagram of a cradle head according to an exemplary embodiment having a first casing on which a waterproof flange is provided.

In an exemplary embodiment, as illustrated in FIG. 5, the two sides of the first casing 42 are preferably provided with a waterproof flange 422 along the circumferential direction of the pitching axis 41. The waterproof flange 422 is used to prevent rainwater from entering into the casings from the gap between the first casing 42 and the second casing 32, which would corrode the pitching axis 41 and the electric circuit therein. Consequently, the reliability of the cradle head is improved.

Alternatively, an annular V channel is defined between the waterproof flange 422 and the side of the first casing 42 so as to allow the rainwater to flow through therein and exit from the bottom of the cradle head, thus improving the waterproof function of the cradle head.

Structural compositions of a cradle head having a protective housing according to exemplary embodiments of the invention have been mentioned above. In addition, exemplary embodiments of the invention further provide a cradle head camera device comprising the cradle head having a protective housing and a camera device 50. The camera device 50 is disposed on the cradle head, and specifically disposed on the camera device mounting seat of the pitching support. The camera device is preferably a 30× or 36× optical zoom imaging core or camera.

Through exemplary embodiments of the invention, the camera device is protected by the protective housing, such that it can withstand erosion from external wind, sand, and rain, thereby preventing fault due to damage caused by erosion; meanwhile, it can also prolong the service life of the device.

Exemplary embodiments of the invention further provide an unmanned aerial vehicle comprising the cradle head camera device.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A cradle head, comprising:
   a yaw support, wherein one end of the yaw support is rotatable around a yaw axis;
   a pitching support rotatably connected to the yaw support via a pitching axis, wherein a camera device mounting seat is provided on the pitching support;
   a roll support, wherein one end of the roll support is rotatably connected to the other end of the yaw support via a rolling axis;
   a first casing attached on the pitching support and defining a first accommodating space, wherein the camera device mounting seat is disposed within the first accommodating space and a camera hole is provided in the first casing; and
   a second casing provided on the roll support and defining a second accommodating space, wherein the roll support is disposed within the second accommodating space; and
   a third casing provided on the yaw support and defining a third accommodating space, wherein the yaw support is disposed within the third accommodating space;
   wherein the first casing, the second casing and the third casing form a part of a curved outer surface of the cradle head.

2. The cradle head according to claim 1, wherein:
   the second casing comprises a first semi-casing and a second semi-casing which are attached to two sides of the roll support and are of an outward concave curved shape;
   a surface of the first casing is of a curved shape, two sides of the first casing are planar, and the camera hole is provided on the curved surface of the first casing; and
   the second casing and the first casing form a substantially spherically shaped surface.

3. The cradle head according to claim 2, wherein a waterproof flange is provided on each of the two sides of the first casing along a circumferential direction of the pitching axis.

4. The cradle head according to claim 3, wherein an annular V groove is defined between each waterproof flange and a respective side of the first casing.

5. The cradle head according to claim 1, wherein:
the pitching support is disposed within the first casing;
the roll support and the pitching axis are disposed within the second casing; and
the yaw axis, the yaw support, and the rolling axis are disposed within the third casing.

6. The cradle head according to claim 1, wherein a surface of the third casing is curved.

7. The cradle head according to claim 1, wherein the first casing, the second casing and the third casing in whole form a waterdrop shape.

8. The cradle head according to claim 1, wherein the roll support is disposed outside the first casing and connected to the pitching support through the pitching axis.

9. The cradle head according to claim 1, wherein the first casing comprises a first semi-casing and a second semi-casing matched with each other.

10. The cradle head according to claim 1, wherein the first casing is configured to make a pitching rotation following the pitching support.

11. The cradle head according to claim 1, wherein the second casing is configured to make a roll rotation following the roll support.

12. The cradle head according to claim 1, wherein the third casing is configured to be able to rotate with the yaw support.

13. A cradle head camera device, comprising:
a cradle head, the cradle head comprising:
a yaw support, wherein one end of the yaw support is rotatable around a yaw axis;
a pitching support rotatably connected to the yaw support via a pitching axis, wherein a camera device mounting seat is provided on the pitching support;
a first casing attached on the pitching support and defining a first accommodating space, wherein the camera device mounting seat is disposed within the first accommodating space and a camera hole is provided in the first casing; and
a waterproof flange provided on each of two sides of the first casing along a circumferential direction of the pitching axis;
wherein the first casing has a curved outer surface; and
a camera device, wherein the camera device is provided on the camera device mounting seat.

14. The cradle head camera device according to claim 13, wherein the camera device is an imaging core or a camera having 30× or 36× optical zoom.

15. The cradle head camera device of claim 13, wherein an annular V groove is defined between each waterproof flange and a respective side of the first casing.

16. The cradle head camera device of claim 13, further comprising a roll support, a second casing provided on the roll support and defining a second accommodating space, and a third casing provided on the yaw support and defining a third accommodating space, wherein one end of the roll support is rotatably connected to the other end of the yaw support via a rolling axis, the roll support is disposed within the second accommodating space, and the yaw support is disposed within the third accommodating space.

17. An unmanned aerial vehicle, comprising:
a cradle head camera device, wherein the cradle head camera device comprises a cradle head and a camera device;
wherein the cradle head comprises:
a yaw support, wherein one end of the yaw support is rotatable around a yaw axis;
a pitching support rotatably connected to the yaw support via a pitching axis, wherein a camera device mounting seat is provided on the pitching support;
a roll support, wherein one end of the roll support is rotatably connected to the other end of the yaw support via a rolling axis;
a first casing attached on the pitching support and defining a first accommodating space, wherein the camera device mounting seat is disposed within the first accommodating space and a camera hole is provided in the first casing;
a second casing provided on the roll support and defining a second accommodating space, wherein the roll support is disposed within the second accommodating space; and
a third casing provided on the yaw support and defining a third accommodating space, wherein the yaw support is disposed within the third accommodating space;
wherein the first casing, the second casing and the third casing form a part of a curved outer surface of the cradle head; and
wherein the camera device is provided on the camera device mounting seat.

18. The unmanned aerial vehicle of claim 17, further comprising a cradle head pedestal for connecting the cradle head to an unmanned aerial vehicle body.

19. The unmanned aerial vehicle of claim 17, wherein a waterproof flange is provided on each of two sides of the first casing along a circumferential direction of the pitching axis.

* * * * *